United States Patent
Bansal et al.

(10) Patent No.: US 11,405,225 B1
(45) Date of Patent: Aug. 2, 2022

(54) COLLABORATION PLATFORM RECOMMENDATION TOOL

(71) Applicant: International Business Machines Corporation, Armonk, NY (US)

(72) Inventors: Shefali Bansal, Bangalore (IN); Raghuveer Prasad Nagar, Kota (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/204,184

(22) Filed: Mar. 17, 2021

(51) Int. Cl.
*G06F 15/16* (2006.01)
*H04L 12/18* (2006.01)
*H04L 65/4053* (2022.01)
*G06F 16/9535* (2019.01)
*H04L 51/046* (2022.01)

(52) U.S. Cl.
CPC ...... *H04L 12/1818* (2013.01); *G06F 16/9535* (2019.01); *H04L 12/1822* (2013.01); *H04L 51/046* (2013.01); *H04L 65/4053* (2013.01)

(58) Field of Classification Search
None
See application file for complete search history.

(56) References Cited

U.S. PATENT DOCUMENTS

| | | | |
|---|---|---|---|
| 6,374,102 B1 | 4/2002 | Brachman | |
| 8,296,376 B2 | 10/2012 | Goldberg | |
| 9,129,225 B2 | 9/2015 | Sathish | |
| 9,648,538 B2 | 5/2017 | Ganesan | |
| 2007/0263825 A1 | 11/2007 | Shah | |
| 2012/0278268 A1* | 11/2012 | Hamalainen | G06F 16/435 706/46 |
| 2015/0089353 A1* | 3/2015 | Folkening | G06F 16/958 715/234 |
| 2015/0142949 A1* | 5/2015 | Nair | H04L 67/2842 709/224 |
| 2015/0281163 A1* | 10/2015 | Bastide | G06Q 10/10 709/206 |

(Continued)

FOREIGN PATENT DOCUMENTS

| | | |
|---|---|---|
| WO | 2000041486 A2 | 7/2000 |
| WO | WO-2016090326 A1 * | 6/2016 |

OTHER PUBLICATIONS

Bassaly et al., "Improving Collaboration Tools Efficiency With Machine Learning", An IP.com Prior Art Database Technical Disclosure, IP.com No. IPCOM000253500D, IP.com Electronic Publication Date: Apr. 4, 2018, Copyright: Copyright 2018 Cisco Systems, Inc., 10 pages, <https://priorart.ip.com/IPCOM/000253500>.

(Continued)

*Primary Examiner* — Phyllis A Book
(74) *Attorney, Agent, or Firm* — Edward J. Wixted, III

(57) ABSTRACT

An optimal collaboration platform of a plurality of collaboration platforms is identified. Activity of the user is monitored. A change from a current collaboration platform to the identified optimal collaboration platform is recommended based on a ranking of the plurality of collaboration platforms and the activity of the user. The recommendation is transmitted to the user. A determination is made whether the user accepts the transmitted recommendation. In response to determining that the user has accepted the transmitted recommendation, the optimal platform is initiated.

20 Claims, 4 Drawing Sheets

(56) References Cited

U.S. PATENT DOCUMENTS

| | | | | |
|---|---|---|---|---|
| 2015/0363092 | A1* | 12/2015 | Morton | G06F 3/04817 |
| | | | | 715/752 |
| 2016/0380820 | A1 | 12/2016 | Horvitz | |
| 2017/0193455 | A1* | 7/2017 | Galvin, Jr | G06F 16/245 |
| 2018/0113937 | A1* | 4/2018 | Togwe | G06Q 10/063 |
| 2018/0322475 | A1* | 11/2018 | Dintenfass | G06Q 20/10 |
| 2019/0007231 | A1* | 1/2019 | Tan | G06Q 50/01 |
| 2019/0014160 | A1* | 1/2019 | Karande | H04L 67/1097 |
| 2019/0034885 | A1* | 1/2019 | DeLand | G06Q 10/02 |
| 2020/0067854 | A1* | 2/2020 | Hewitt | H04L 51/046 |
| 2020/0076907 | A1* | 3/2020 | Jalagam | G06F 11/3006 |
| 2020/0137068 | A1* | 4/2020 | Dintenfass | H04W 12/02 |
| 2020/0159950 | A1* | 5/2020 | Bodin | G06F 8/30 |
| 2020/0242527 | A1* | 7/2020 | Das | G06F 16/9024 |
| 2021/0157643 | A1* | 5/2021 | Shear | G06F 16/245 |
| 2021/0406804 | A1* | 12/2021 | Hamid | G06Q 10/103 |

OTHER PUBLICATIONS

Felfernig et al., "An overview of recommender systems in the internet of things", Published: Oct. 1, 2018, 30 pages, <https://link.springer.com/article/10.1007/s10844-018-0530-7>.

Rauv, Siv, "15 Essential Collaboration and Communication Platforms And Software to Use", Jun. 22, 2017, 8 pages, <https://www.elcom.com.au/resources/blog/15-essential-communication-platforms-and-software-to-use>.

Sheivachman, Andrew, "Overwhelmed Conference Attendees Crave Personalized Recommendations", Skift, Mar. 6, 2019, 5 pages, <https://skift.com/2019/03/06/overwhelmed-conference-attendees-crave-personalized-recommendations/>.

* cited by examiner

COLLABORATION PLATFORM RECOMMENDATION TOOL

BACKGROUND

The present invention relates generally to the field of electronic conferences, and more particularly to providing a recommendation for an optimal collaboration platform.

Electronic conferences, or e-cons for short, are popular tools for many businesses today. An e-con allows people to "meet" regardless of where they are located, within the same state, within the same country, or anywhere across the globe where Internet and/or telecommunication system access is available. E-cons are used for both intracompany and intercompany communications as well as for personal communication. There are several reasons why a company might use any of the available collaboration platforms including reducing travel expenses, the ability to meet quickly to resolve a technical problem, and minimizing the spread of a virus during a health crisis. Users can connect to an e-con via any number of computing devices (e.g., desktop computers, laptop computers, tablet computers, and smartphones) using any one of several types of networks (e.g., a hardwired connection, a Wi-Fi (wireless fidelity) connection, and a mobile network).

SUMMARY OF THE INVENTION

Embodiments of the present invention include an approach for providing a recommendation for an optimal collaboration platform. In one embodiment, an optimal collaboration platform of a plurality of collaboration platforms is identified. Activity of the user is monitored. A change from a current collaboration platform to the identified optimal collaboration platform is recommended based on a ranking of the plurality of collaboration platforms and the activity of the user. The recommendation is transmitted to the user. A determination is made whether the user accepts the transmitted recommendation. In response to determining that the user has accepted the transmitted recommendation, the optimal platform is initiated.

DETAILED DESCRIPTION

Figure 1:
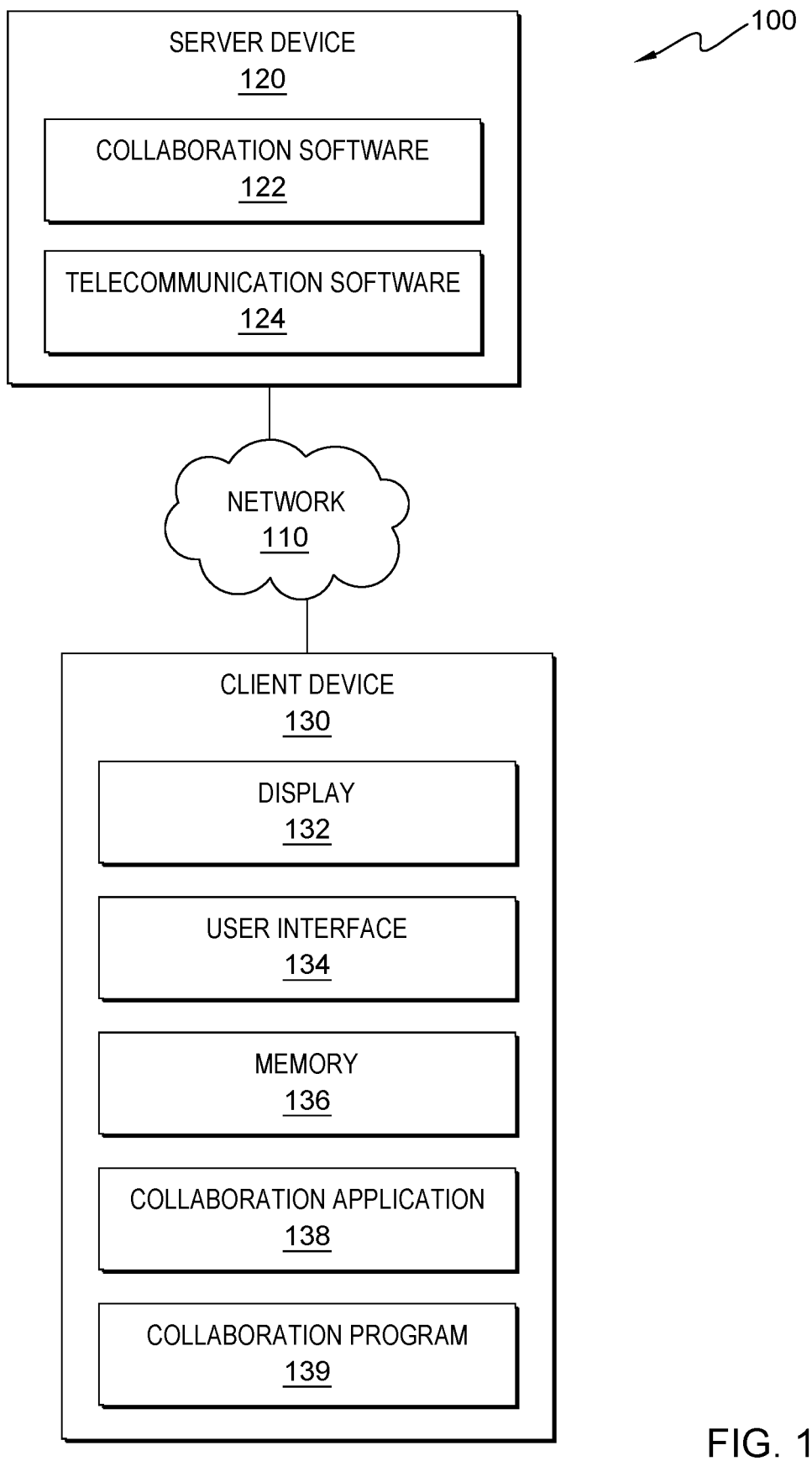
FIG. 1 depicts a functional block diagram illustrating a computing environment which includes a collaboration program, in accordance with an embodiment of the present invention.

Embodiments of the present invention recognize that we live in a connected world. Examples include our work computers connected to a company's proprietary data, our smartphones connected to our financial institutions and preferred social media websites, our laptop or desktop computers connected to our physician's offices for virtual visits, and our exercise bikes, treadmills, Internet of things devices, trucks and cars connected to the Internet. Each of these connections utilize a particular network and collaboration tool (i.e., a collaboration platform); sometimes the collaboration platform functions as it should while other times issues arise (e.g., connectivity, availability, hardware failure, etc.). A solution is needed that is capable of identifying an optimal collaboration platform for a user.

Embodiments of the present invention recognize that there may be a method, computer program product, and computer system for providing a recommendation for an optimal collaboration platform. The method, computer program product, and computer system improves the technology of collaboration platforms by identifying an optimal collaboration tool and an associated network for a user based on a number of variables that can affect the experience of the user. In response to determining the affirmative opt-in of a user, available collaboration platforms are ranked based on several condition determinations. In the event that a user needs to change a current collaboration platform, the method, computer program product, and computer system recommends a new collaboration platform based on the ranking. If the user accepts the recommendation, the electronic conference, on-going in the current collaboration platform, is dynamically initiated on the recommended collaboration platform allowing the user to seamlessly switch collaboration platforms.

In an embodiment, an indication of an on-going collaboration (i.e., electronic conference, or e-con) is received. In the embodiment, the opt-in of a user is confirmed. Further yet in the embodiment, event parameters of the e-con are determined. Further yet in the embodiment, a current location is identified. Further yet in the embodiment, available collaboration platforms are determined. Further yet in the embodiment, network state associated with the available platforms are determined. Further yet in the embodiment, the available collaboration platforms are ranked. Further yet in the embodiment, activity of the user is monitored. Further yet in the embodiment, a recommendation to change collaboration platforms is transmitted to the user. Further yet in the embodiment, a determination is made whether the user accepts the change in collaboration platforms. Further yet in the embodiment, in response to the user accepting the change, information associated with the recommended change. Further yet in the embodiment, a new collaboration platform is initiated. Further yet in the embodiment, confirmation of the user switching to the new platform is received.

According to another embodiment, an indication from a user is received. In the embodiment, the opt-in of a user is confirmed. Further yet in the embodiment, one or more upcoming collaborations (i.e., e-cons) of the user are determined. Further yet in the embodiment, locations associated with each of the one or more upcoming e-cons are determined. Further yet in the embodiment, collaboration platform history of the user is retrieved. Further yet in the embodiment, a nearest collaboration platform (nearest to the first e-con of the one or more determined e-cons) is identified. Further yet in the embodiment, a collaboration platform is recommended. Further yet in the embodiment, a determination is made whether the user has a next collaboration in the one or more upcoming collaborations.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

FIG. 1 is a functional block diagram illustrating a computing environment, generally designated 100, in accordance with one embodiment of the present invention. FIG. 1 provides only an illustration of one implementation of the present invention and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes server device 120, and client device 130 interconnected by network 110. In example embodiments, computing environment 100 includes other computing devices (not shown in FIG. 1) such as additional wearable technology, cell phones, smartphones, phablets, tablet computers, laptop computers, desktop computers, other computer servers, or any other computer system known in the art, interconnected with server device 120, and client device 130 over network 110.

In embodiments of the present invention, server device 120 and client device 130 are connected to network 110, which enables server device 120 and client device 130 to access other computing devices and/or data not directly stored on server device 120 and client device 130. Network 110 may be, for example, a short-range, low power wireless connection, a local area network (LAN), a telecommunications network, a wide area network (WAN) such as the Internet, or any combination of the four, and include wired, wireless, or fiber optic connections. Network 110 includes one or more wired and/or wireless networks that are capable of receiving and transmitting data, voice, and/or video signals, including multimedia signals that include voice, data, and video information. In general, network 110 is any combination of connections and protocols that will support communications between server device 120 and client device 130, and any other computing devices (not shown in FIG. 1) connected to network 110, in accordance with embodiments of the present invention.

According to an embodiment, server device 120 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, server device 120 can be a standalone computing device, a management server, a web server, a mobile computing device, or any other electronic device or computing system capable of receiving, transmitting, and processing data. In other embodiments, server device 120 can represent computing systems utilizing multiple computers as a server system, such as in a cloud computing environment. In certain embodiments, server device 120 represents a computer system utilizing clustered computers and components (e.g., database server computers, application server computers, etc.) that act as a single pool of seamless resources when accessed by elements of computing environment 100. In general, server device 120 is representative of any electronic device or combination of electronic devices capable of executing computer readable program instructions. According to one embodiment, server device 120 is a device that enables various types of network communications. In an embodiment, computing environment 100 includes any number of server device 120. Server device 120 may include internal and external hardware components as depicted and described in further detail with respect to FIG. 3, in accordance with embodiments of the present invention. In an embodiment, server device 120 also includes collaboration software 122 and telecommunication software 124.

In an embodiment, collaboration software 122 is a set of applications or programs that enable two or more users to meet virtually via an available network. According to an embodiment, collaboration software 122 is an electronic conference (e-con) application. The e-con application may be a file sharing application, a real-time messaging application, an audio only application, or an application that includes all of file sharing, messaging, audio, and video. Collaboration software 122 can utilize any technologies known in the art for communication and data transmission including, for example, the Internet.

According to an embodiment of the present invention, telecommunication software 124 is a set of applications or programs that enable various forms of electronic communication between two or more people. In an embodiment, telecommunication software 124 includes, but is not limited to, landline communication via a metal wire or fiber-optic cable, cellular communication via wireless networks, and satellite communication via multiple communication satellites. Voice and/or data communications can be transmitted over telecommunications software 124.

In an embodiment, client device 130 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, client device 130 can be a standalone computing device, a management server, a web server, a mobile computing device, or any other electronic device or computing system capable of receiving, transmitting, and processing data. In other embodiments, client device 130 can represent computing systems utilizing multiple computers as a server system, such as in a cloud computing environment. In certain embodiments, client device 130 represents a computer system utilizing clustered computers and components (e.g., database server computers, application server computers, etc.) that act as a single pool of seamless resources when accessed by elements of computing environment 100. In general, client device 130 is representative of any electronic device or combination of electronic devices capable of executing computer readable program instructions. According to one embodiment, client device 130 is a laptop computer used for electronic conferences via a collaboration application. In an embodiment, computing environment 100 includes any number of client device 130. Client device 130 may include internal and external hardware components as depicted and described in further detail with respect to FIG. 3, in accordance with embodiments of the present invention. In an embodiment, client device 130 also includes display 132, user interface (UI) 134, memory 136, collaboration application 138, and collaboration program 139.

According to an embodiment of the present invention, display 132 is an electronic visual device for a desktop computer, laptop computer, tablet computer, smartphone, smart-watch, and any other computing device known in the art. Display 132 may include a touchscreen which is an input device layered on top of the display for allowing a user to control an electronic device via simple or multi-touch gestures by touching display 132 with a special stylus and/or one or more fingers. Display 132 displays user interface 134 as well as open programs and applications, allowing a user of client device 130 to interact with the open programs and applications via a keyboard and mouse (not shown in FIG. 1). Display 132 may be a thin film transistor liquid crystal display (TFT-LCD), a flat panel LED (light emitting diode) display, or a cathode ray tube (CRT). Display 132 may be connected to client device 130 via VGA (video graphics array), DVI (digital video interface), HDMI (High Definition Multi-Media Interface or any other connection type known in the art.

In an embodiment, UI 134 provides an interface between a user of client device 130, server device 120, and collaboration program 139. UI 134 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. UI 134 may also be mobile application software that provides an interface between client device 130, server device 120, and collaboration program 139. Mobile application software, or an "app," is a computer program designed to run on smartphones, tablet computers and other mobile devices. UI 134 enables a user of client device 130 to interact with server device 120, collaboration software 122, telecommunication software 124, collaboration program 139, any other programs and applications included on server device 120 and client device 130 (not shown in FIG. 1), and any other computing devices (not shown in FIG. 1).

According to an embodiment, memory 136 is storage that is written to and/or read by client device 130, collaboration program 139, and any other programs and applications on server device 120 and client device 130. In one embodiment, memory 136 resides on client device 130. In other embodiments, memory 136 resides on server device 120, on any other device (not shown in FIG. 1) in computing environment 100, in cloud storage, or on another computing device accessible via network 110. In yet another embodiment, memory 136 represents multiple storage devices within client device 130. Memory 136 may be implemented using any volatile or non-volatile storage media for storing information, as known in the art. For example, memory 136 may be implemented with a tape library, optical library, one or more independent hard disk drives, multiple hard disk drives in a redundant array of independent disks (RAID), solid-state drives (SSD), or random-access memory (RAM). Similarly, memory 136 may be implemented with any suitable storage architecture known in the art, such as a relational database, an object-oriented database, or one or more tables. In an embodiment of the present invention, server device 120, client device 130, collaboration program 139, and any other programs and applications (not shown in FIG. 1) operating on server device 120 and client device 130 may store, read, modify, or write data to memory 136. In an embodiment of the present invention, data stored to memory 136 includes, but is not limited to, collaboration platform history of a user of client device 130.

In an embodiment of the present invention, collaboration application 138 is one of a number of various software applications that allows two or more people to virtually meet and participate together in a meeting. The two or more people can be located on two different floors in the same building or on two different continents on the planet. Collaboration application 138 is installed on a computing device of a user (e.g., on a mobile device such as a smartphone or tablet computer, on a more traditional computing device such as a desktop or laptop computer, or on any other computing device known in the art that is compatible with electronic conferencing programs). Collaboration application 138 can be used for both personal and business meetings and provides advantages over face-to-face meetings such as saving time and money for businesses by reducing travel and the associated expenses, increasing efficiency as meeting can take place whenever it is convenient for the participants, and simplifying communication as electronic conferencing software, such as collaboration application 138 are simple to use and allow people to meet even during a pandemic when people need to maintain social distance for safety considerations.

In an embodiment of the present invention, collaboration program 139 is a program, a subprogram of a larger program, an application, a plurality of applications, or mobile application software, which functions to provide a recommendation for an optimal collaboration platform. A program is a sequence of instructions written to perform a specific task. In an embodiment, collaboration program 139 runs independently. In other embodiments, collaboration program 139 depends on system software and/or other programs (not shown in FIG. 1) to execute. According to an embodiment, collaboration program 139 is a cognitive system based on artificial intelligence utilizing machine learning and deep learning which recommends an optimal collaboration platform to a user based on a collaboration platform history of said user as well as currently available platforms and their associated states. In one embodiment, collaboration program 139 functions as a stand-alone program residing on client device 130. In another embodiment, collaboration program 139 works in conjunction with other programs, applications, etc., found in computing environment 100. In yet another embodiment, collaboration program 139 resides on other computing devices such as server device 120 in computing environment 100, which is interconnected to client device 130 via network 110.

According to an embodiment, collaboration program 139 receives an indication of an on-going collaboration (i.e., electronic conference, or e-con). In the embodiment, collaboration program 139 confirms that a user participating in the e-con has opted-in. Further in the embodiment, collaboration program 139 determines the event parameters of the on-going e-con. Further yet in the embodiment, collaboration program 139 identifies the current location of the opted-in user. Further yet in the embodiment, collaboration program 139 determines one or more collaboration platforms available to said user, including the in-use collaboration platform for the on-going e-con. Further yet in the embodiment, collaboration program 139 determines the current state of each network associated with the available collaboration platforms. Further yet in the embodiment, collaboration program 139 ranks the available collaboration platforms. Further yet in the embodiment, collaboration program 139 monitors activity of said user. Further yet in the embodiment, collaboration program 139 transmits a change recommendation to said user. Further yet in the embodiment, collaboration program 139 determines whether the recommendation is accepted by said user. Further yet in the embodiment, responsive to determining that the recommendation is accepted, collaboration program 139 stores information. Further yet in the embodiment, collaboration program 139 initiates a new collaboration platform. Further yet in the embodiment, collaboration program 139 receives a confirmation of said user switching to the new collaboration platform.

In another embodiment, collaboration program 139 receives an indication from a user. In the embodiment, collaboration program 139 confirms the opt-in of said user. Further in the embodiment, collaboration program 139 determines one or more upcoming collaborations (e-cons) for said user. Further yet in the embodiment, collaboration program 139 determines locations for each of the upcoming e-cons. Further yet in the embodiment, collaboration program 139 retrieves a collaboration platform history of said user. Further yet in the embodiment, collaboration program 139 identifies a nearest collaboration platform (nearest to the first e-con of the one or more determined e-cons). Further yet in the embodiment, collaboration program 139 recommends a collaboration platform to said user for the first e-con of the one or more upcoming e-cons. Further yet in the embodiment, collaboration program 139 determines whether said user has a next collaboration in the one or more upcoming collaborations.

Figure 2A:
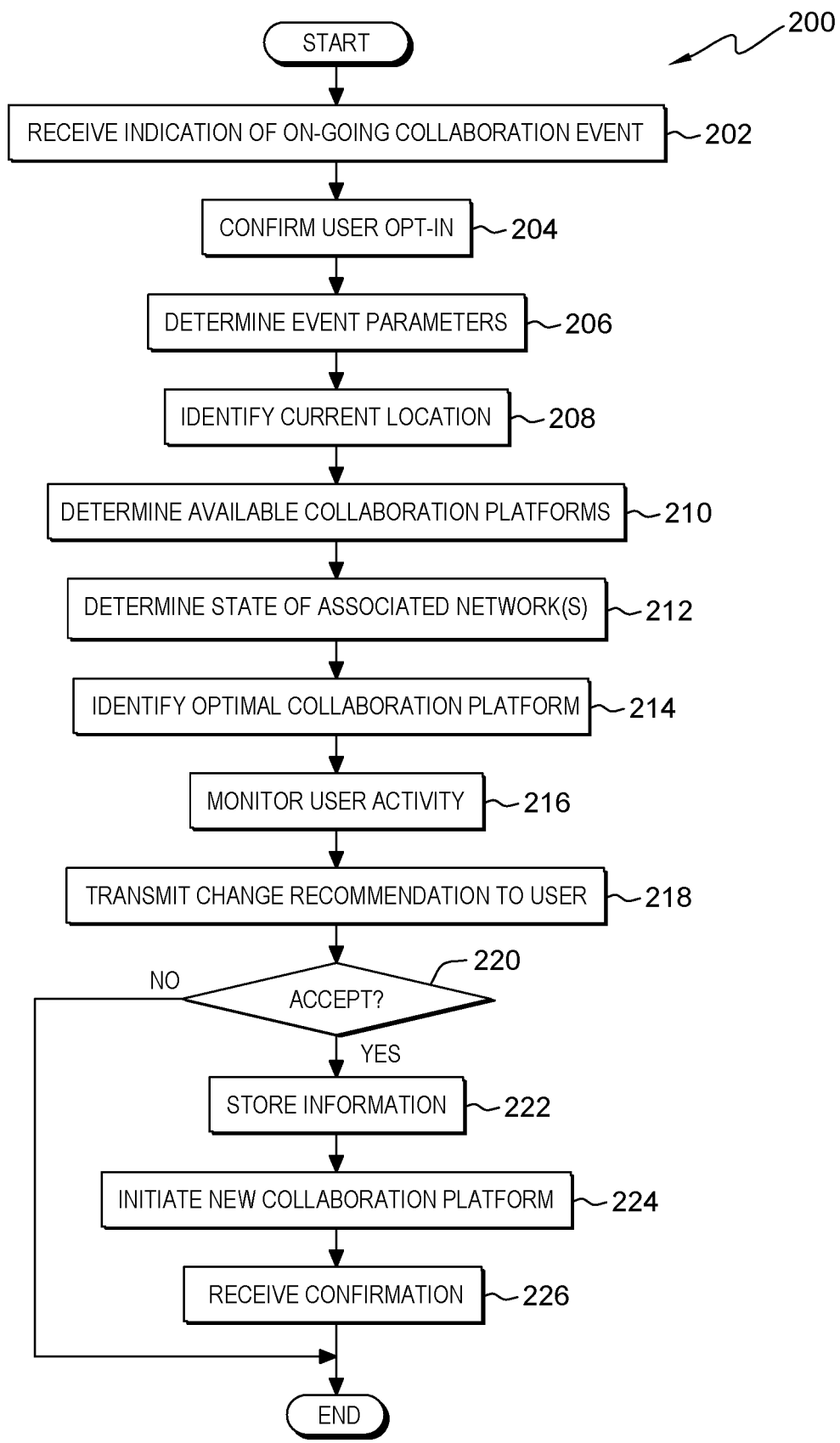
FIG. 2A is a flowchart depicting operational steps of a program for providing a recommendation for an optimal collaboration platform when a change of platform may be needed, on a computing device within the computing environment of FIG. 1, in accordance with an embodiment of the present invention.

FIG. 2A is a flowchart of workflow 200 depicting operational steps for providing a recommendation for an optimal collaboration platform when a change of platforms may be needed. In one embodiment, the method of workflow 200 is performed by collaboration program 139 on client device 130. In an alternative embodiment, the method of workflow 200 is performed by any other program in computing environment 100 working with collaboration program 139. In an embodiment, a user of client device 130 invokes workflow 200 upon accessing collaboration program 139. In another embodiment, collaboration program 139 is invoked by a user of server device 120. In yet another embodiment, workflow 200 is dynamically invoked upon the start of an electronic conference (e-con).

In an embodiment, collaboration program 139 receives an indication of an on-going collaboration event (step 202). In other words, collaboration program 139 receives an indication that a user is participating in an on-going collaboration event such as an electronic conference, or an e-con. According to an embodiment, the user may have initiated the e-con or the user may have joined a previously initiated e-con. In an embodiment, collaboration program 139 receives an indication that a user of client device 130 has joined an on-going e-con via collaboration application 138 on client device 130. For example, a program on a laptop computer used by Ann receives an indication that Ann has joined a virtual department meeting with her six colleagues using her laptop and a wireless connection to the Internet.

According to an embodiment of the present invention, collaboration program 139 confirms user opt-in (step 204). In other words, responsive to receiving an indication that a user of client device 130 has joined an on-going e-con, collaboration program 139 confirms that said user has opted-in by granting permission to collaboration program 139. In an embodiment, collaboration program 139 confirms the opt-in of the user by retrieving opt-in information associated with the user from a memory, such as memory 136 on client device 130. In the embodiment, collaboration program 139 may utilize various accessible data sources that may include personal data, content, or information said e-con participant wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Opting-in to use collaboration program 139 enables the authorized and secure processing of personal data. Collaboration program 139 provides informed consent, with notice of the collection of personal data, allowing said user to opt-in or opt-out of processing personal data. Consent can take several forms. Opt-in consent can impose on a user to take an affirmative action before personal data is processed. Alternatively, opt-out consent can impose on the user to take an affirmative action to prevent the processing of personal data before personal data is processed. Collaboration program 139 provides information regarding personal data and the nature (e.g., type, scope, purpose, duration, etc.) of the processing. Collaboration program 139 provides said user with copies of stored personal data, if any personal data is stored. Further, collaboration program 139 allows for the correction or completion of incorrect or incomplete personal data and also allows for the immediate deletion of personal data. According to an embodiment, collaboration program 139 on client device 130 confirms that said user of client device 130 has opted-in to collaboration program 139 by retrieving opt-in information associated with said user from memory 136 on client device 130. For example, the program on Ann's laptop confirms that Ann has opted-in by retrieving opt-in information from a memory on the laptop.

In an embodiment, collaboration program 139 determines event parameters (step 206). In other words, collaboration program 139 determines the parameters of the on-going e-con collaboration said user has joined. According to an embodiment, collaboration program 139 determines event parameters including, but not limited to, a start time of the event, an end time of the event, a subject of the event, other participants of the event, and the collaboration platform being utilized by said user. The parameters are determined by retrieving a calendar entry of said user associated with the on-going e-con. In an embodiment, collaboration program 139 on client device 130 determines event parameters from a calendar entry of said user of client device 130. For example, the program on Ann's laptop determines that the virtual department meeting is being held from 10:00 AM to 11:00 AM on Monday, April 10 of the current year. The program further determines that Ann is using her laptop and a Wi-Fi (wireless fidelity) network as the collaboration platform to participate in the meeting.

According to an embodiment, collaboration program 139 identifies a current location (step 208). In other words, collaboration program 139 the current location of the user who has joined the on-going e-con. In an embodiment, collaboration program 139 uses any technology known in the art to identify the current location; for example, collaboration program 139 may use a global positioning system (GPS), a network address (i.e., an Internet protocol, or IP, address), and said user's calendar to identify the current location. According to an embodiment, collaboration program 139 identifies the current location of said user based on the IP address of the network utilized by said user. For example, the program on Ann's laptop determines that Ann is using her home Wi-Fi network and thus, identifies that Ann's location is at her home.

In an embodiment, collaboration program 139 determines available collaboration platforms (step 210). In other words, collaboration program 139, based on the identified location, determines the available collaboration platforms at that identified location. According to an embodiment, collaboration program 139 determines the available collaboration platforms by retrieving a history of e-con participation associated with said user and by determining other networks available at the identified location. Available collaboration platforms include, but are not limited to, a hardwire access to the Internet, a hardwire access to a company network, Wi-Fi access to the Internet, Wi-Fi access to a company network, a cellular access to a company network, and a cellular access to the Internet. In an embodiment, collaboration program 139 on client device 130 determines the available collaboration platforms at the identified location, including collaboration application 138 on network 110. For example, the program on Ann's laptop determines that Ann can participate in the virtual department meeting by using her home Wi-Fi network and her laptop or by using a cellular network and her smartphone.

According to an embodiment, collaboration program 139 determines a state of an associated network (step 212). In other words, collaboration program 139 determines the state of each network included in the determined available collaboration platforms. In an embodiment, collaboration program 139 collects network state data over time and uses this historical data to determine the state of a network. In another embodiment, collaboration program 139 uses real-time diagnostic tests (e.g., speed test, signal strength, etc.) to determine the state of the network. According to an embodiment of the present invention, collaboration program 139 determines the state of network 110 by performing a speed test between server device 120 and client device 130. For example, the program on Ann's laptop determines the state of her home Wi-Fi network by performing a speed test of said Wi-Fi network and determines the state of the cellular network by measuring the signal strength of said cellular network.

In an embodiment, collaboration program 139 identifies the optimal collaboration platform (step 214). In other words, based upon the available collaboration platforms, the determined states of each of the platforms and their respective associated networks, and determined costs associated with utilizing each collaboration platform (e.g., when not on an unlimited data plan for a cellular network), collaboration program 139 ranks the available collaboration platforms and identifies the optimal collaboration platform. In one embodiment, the optimal collaboration platform is the platform which meets the specific requirements (or specifications, preferences, etc.) of a user. For example, if a user needs portability, a smartphone connected to a cellular network would meet the requirements and thus be the optimal platform while a hard-wired desktop computer would not meet the user requirements. In another example, if the user specifies that a highest speed available is needed, the optimal platform would likely be the user's work computer that is hard-wired to the company's network. The ranking is a ranking of each collaboration platform relative to one another. According to an embodiment, collaboration program 139 ranks a collaboration platform "high" when said collaboration platform is (i) available, (ii) has a low usage cost, and (iii) has an acceptable state (e.g., sufficient speed and signal strength to perform required tasks). A collaboration platform is ranked "low" when said collaboration platform is (i) not available, (ii) has a higher usage cost, or (iii) has an inadequate state (e.g., insufficient speed or signal strength to perform the required tasks). In the rankings, the three attributes, relative to one another, are rated as platform availability (or ease of availability) followed by platform state and then platform cost. For example, if a user prefers signal strength over speed (because the user would rather have a slow connection rather than being dropped from a weak signal), the collaboration platform with the best signal strength would be ranked the highest. In another example, if the user is on a tight budget, the lowest cost collaboration platform would be ranked the highest. In an embodiment, collaboration program 139 ranks the available collaboration platforms at the identified location based on their respective availability, state, and costs and thus, identifies the optimal collaboration platform; the results indicate that collaboration application 138 using network 110 is the highest ranked collaboration platform and therefore, the optimal collaboration platform. For example, the program on Ann's laptop ranks her home Wi-Fi network and her laptop as the optimal collaboration platform and ranks her smartphone and the cellular network as the next best collaboration platform. In the example, the rankings are based primarily on cost as Ann has unlimited access to the Internet through her Internet Service Provider (ISP) while she only pays for five (5) gigabits (Gb) of data a month on the cellular network. In another example, the rankings may be reversed if the ISP has been having outages over the last month (i.e., the state of the network would be downgraded relative to that of the cellular network).

According to an embodiment of the present invention, collaboration program 139 monitors activity of the user (step 216). In other words, collaboration program 139 accesses the user's calendar and uses natural language processing to determine upcoming events, monitors the user's communications (e.g., e-mails, text messages, phone calls, etc.), monitors the user's physical movements, and the like. In an embodiment, collaboration program 139 monitors the activity to determine if a change may be required to the user's current collaboration platform. Reasons that a change may be needed include, but are not limited to the user having another meeting that begins during the current, on-going collaboration, the user receives a text reminder of a non-business related appointment that is not included on the business calendar of the user, and the user moves from one location to another that has a lower signal strength. According to an embodiment, collaboration program 139 monitors the activity of the user of collaboration application 138 on client device 130; based on the monitored activity, collaboration program 139 determines if a change of collaboration platforms is recommended. For example, the program on Ann's laptop monitors Ann's activities. The program determines, based on the monitored activity, that Ann has received a "reminder" on her smartphone of a physical therapy (PT) appointment at 11:00 AM on Monday, immediately following the virtual department meeting. However, because Ann will need to drive to the PT appointment, she will need to (i) leave the virtual department meeting early or (ii) change collaboration platforms to continue participating in said meeting. Thus, a change of collaboration platforms is recommended.

In an embodiment, collaboration program 139 transmits a change recommendation to the user (step 218). In other words, responsive to monitoring the activities of the user, collaboration program 139 transmits a recommendation to the user that said user change collaboration platforms. According to an embodiment, collaboration program 139 uses natural language processing (NLP) based text synthesis to create the transmitted change recommendation in text form. According to another embodiment, collaboration program 139 uses text-to-speech technology to create the transmitted change recommendation in audio form. The change recommendation is transmitted to the user via any technology known in the art (e.g., a text message to a smartphone, a pop-up message within collaboration application 138, an audio message to an available audio player, etc.). In an embodiment, collaboration program 139 transmits a change recommendation via network 110 to the user of client device 130. For example, the program on Ann's laptop transmits a text message to a messaging application included on the laptop; the transmitted text message received by Ann reads "Due to your PT appointment at 11:00 AM, you should switch to your smartphone and mobile network at 10:40 AM to continue the department meeting while you drive to PT (please use a hands free device for safety).".

According to an embodiment, collaboration program 139 determines whether the transmitted recommendation is accepted (decision step 220). In other words, collaboration program 139 determines whether or not the user that received the transmitted change recommendation has accepted the recommended change. In an embodiment, the determination is made by collaboration program 139 based on collaboration program 139 receiving an indication from the user (e.g., the user clicks a displayed "accept" button). According to an embodiment (decision step 220, NO branch), collaboration program 139 determines that the user has not accepted the change recommendation; therefore, collaboration program 139 ends. According to the embodiment (decision step 220, YES branch), collaboration program 139 determines that the user has accepted the change recommendation; therefore, collaboration program 139 proceeds to step 222 to store information.

According to another embodiment, collaboration program 139 automatically initiates the transmitted recommendation for the user. In other words, based on the transmitted recommendation, the history of the user (e.g., the user historically changes from a laptop to a smartphone for the same weekly meeting), or the current environment of the user (e.g., the battery on the smartphone being utilized by the user is running low on power), collaboration program 139 automatically initiates the transmitted recommendation of a platform change for the user. In the embodiment, collaboration program 139 loads and launches the recommended collaboration platform enabling a seamless transition for the user between the current and the recommended platforms.

In an embodiment, collaboration program 139 stores information (step 222). In other words, responsive to the user accepting the change recommendation, collaboration program 139 stores information relevant to the change recommendation. According to an embodiment, collaboration program 139 stores the information to an available memory. Information stored includes, but is not limited to, current day and time of the e-con, current location of the user, current collaboration platform utilized by the user, other available collaboration platforms, the ranking of the collaboration platforms, the recommendation of the optimal collaboration platform, and the response of the user to the recommendation. In an embodiment, collaboration program 139 stores information to memory 136 on client device 130. For example, the program on Ann's laptop stored information concerning the virtual department meeting to an available memory included on the laptop.

According to an embodiment of the present invention, collaboration program 139 initiates a new collaboration platform (step 224). In other words, in further response to the user accepting the change recommendation, collaboration program 139 initiates the recommended optimal collaboration platform for the user. In an embodiment, collaboration program 139, as part of the collaboration platform initiation, joins the on-going collaboration event on the newly initiated collaboration platform which allows a seamless transition between collaboration platforms for the user. If required, collaboration program 139 is able to cache data from the on-going collaboration and make said data available to the user after said user changes collaboration platforms. The cache is cleared by collaboration program 139. According to an embodiment, collaboration program 139 initiates a new collaboration platform for the user of client device 130. For example, the program on Ann's laptop initiates the virtual department meeting on Ann's smartphone which is connected to a cellular network. The virtual department meeting is joined in real-time allowing Ann to participate in said meeting via the smartphone/cellular network collaboration platform without missing any information.

In an embodiment, collaboration program 139 receives confirmation (step 226). In other words, collaboration program 139 receives confirmation from the user indicating that said user has successfully transitioned to the initiated, optimal collaboration platform. According to an embodiment, collaboration program 139 receives the confirmation when the user disables the current collaboration platform and switches to the optimal collaboration platform. In an embodiment, collaboration program 139 receives confirmation that the user of client device 130 has switched to the initiated platform based on said user closing collaboration application 138 on client device 130. For example, the program on Ann's laptop receives confirmation that Ann has switched to her smartphone for the virtual department meeting when Ann closes the lid on the laptop putting it to sleep.

Figure 2B:
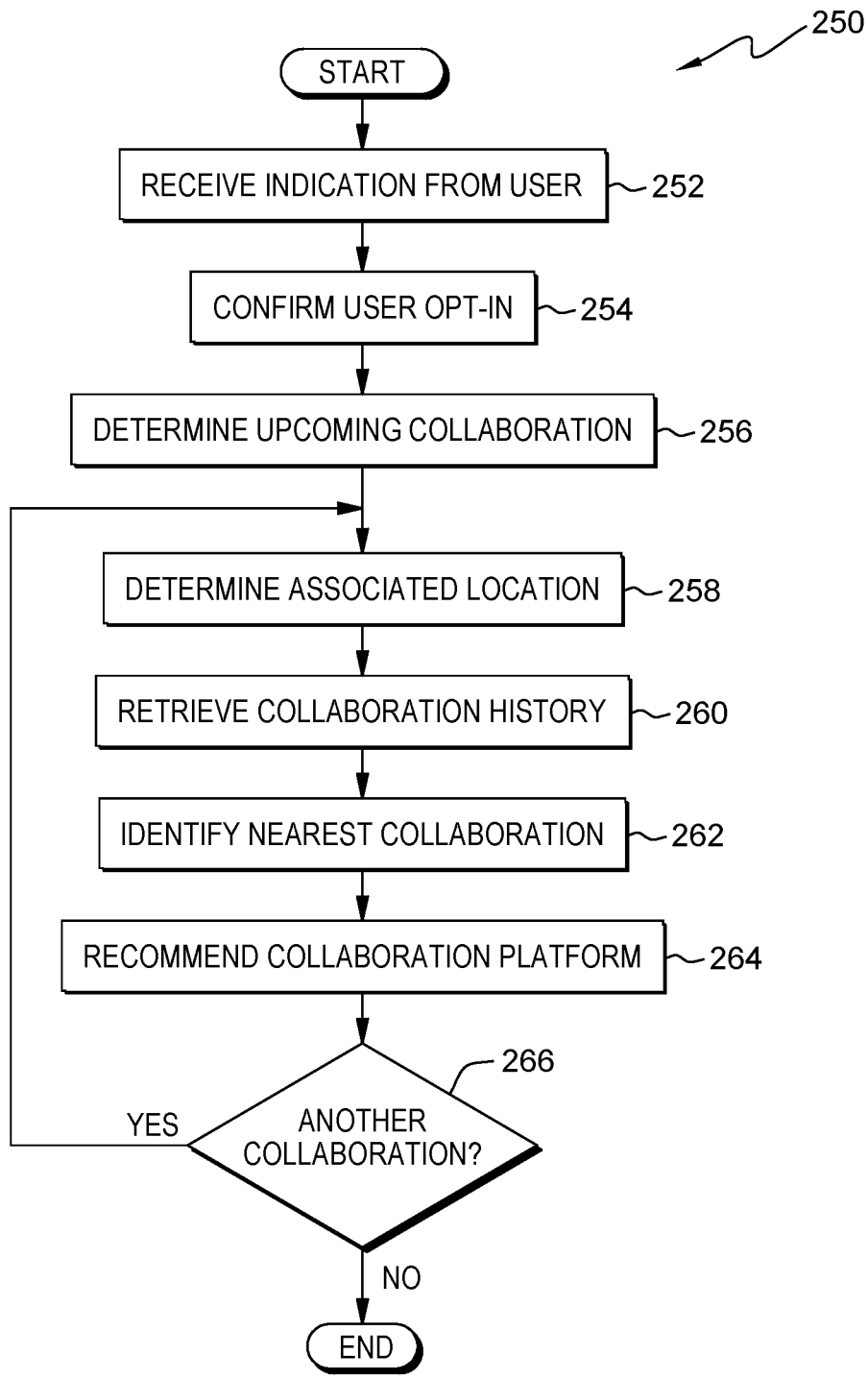
FIG. 2B is a flowchart depicting operational steps of a program for providing a recommendation for an optimal collaboration platform prior to the initiation of an electronic conference, in accordance with an embodiment of the present invention.

FIG. 2B is a flowchart of workflow 250 depicting operational steps for providing a recommendation for an optimal collaboration platform prior to the initiation of an electronic conference (e-con). In one embodiment, the method of workflow 250 is performed by collaboration program 139 on client device 130. In an alternative embodiment, the method of workflow 250 is performed by any other program in computing environment 100 working with collaboration program 139. In an embodiment, a user of client device 130 invokes workflow 250 upon accessing collaboration program 139. In another embodiment, collaboration program 139 is invoked by a user of server device 120. In yet another embodiment, workflow 200 is dynamically invoked upon a user powering on a computing device such as a laptop computer.

In an embodiment, collaboration program 139 receives an indication from a user (step 252). In other words, collaboration program 139 receives an indication from a user that said user may utilize a collaboration platform. According to the embodiment, the received indication may be a result of the user powering on a computing device, the user opening a collaboration application, or any other indication known in the art. In an embodiment, collaboration program 139 receives an indication from the user of client device 130. For example, a program on Bob's tablet computer receives an indication of Bob powering on the tablet.

According to an embodiment of the present invention, collaboration program 139 confirms user opt-in (step 254). In other words, responsive to receiving an indication from a user, collaboration program 139 confirms that said user has opted-in by granting permission to collaboration program 139. In an embodiment, collaboration program 139 confirms the opt-in of the user by retrieving opt-in information associated with the user from a memory, such as memory 136 on client device 130. In the embodiment, collaboration program 139 may utilize various accessible data sources that may include personal data, content, or information said e-con participant wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Opting-in to use collaboration program 139 enables the authorized and secure processing of personal data. Collaboration program 139 provides informed consent, with notice of the collection of personal data, allowing said user to opt-in or opt-out of processing personal data. Consent can take several forms. Opt-in consent can impose on a user to take an affirmative action before personal data is processed. Alternatively, opt-out consent can impose on the user to take an affirmative action to prevent the processing of personal data before personal data is processed. Collaboration program 139 provides information regarding personal data and the nature (e.g., type, scope, purpose, duration, etc.) of the processing. Collaboration program 139 provides said user with copies of stored personal data, if any personal data is stored. Further, collaboration program 139 allows for the correction or completion of incorrect or incomplete personal data and also allows for the immediate deletion of personal data. According to an embodiment, collaboration program 139 on client device 130 confirms that said user of client device 130 has opted-in to collaboration program 139 by retrieving opt-in information associated with said user from memory 136 on client device 130. For example, the program on Bob's tablet confirms that Bob has opted-in by retrieving opt-in information from a memory on the tablet.

In an embodiment, collaboration program 139 determines upcoming collaborations (step 256). In other words, collaboration program 139 determines the upcoming collaborations that require participation of the opted-in user. According to an embodiment, collaboration program 139 determines upcoming collaborations by accessing a calendar of the user, by accessing communications of the user, or by accessing a history of the user's past collaborations. Collaboration program 139 can access upcoming collaborations for the current day, for the current week, or for any predefined time period. In an embodiment, collaboration program 139 determines upcoming collaborations on the day's calendar of the user of client device 130. For example, the program on Bob's tablet determines that Bob has two collaborations scheduled for the current day.

According to an embodiment, collaboration program 139 determines associated locations (step 258). In other words, collaboration program 139 determines a current location of the user and a location of the first determined collaboration. In an embodiment, the location of the first determined collaboration may be in the same location as the current location of the user or it may be in a different location. In the embodiment, collaboration program 139 uses a global positioning system (GPS), a network address (i.e., an Internet protocol, or IP, address), and/or said user's calendar to identify the current location. Collaboration program 139 uses the calendar of the user and/or the history of the user's past collaborations to determine the location of the first determined collaboration. According to an embodiment, collaboration program 139 determines the current location of the user of client device 130 and the first upcoming collaboration of the user. For example, the program on Bob's tablet determines that Bob is currently at his workplace office, and further determines that Bob's first collaboration of the day is at a customer's office building.

In an embodiment, collaboration program 139 retrieves a collaboration history (step 260). In other words, collaboration program 139 retrieves a collaboration history associated with the user. According to an embodiment of the present invention, the collaboration history associated with the user includes at least the past collaborations of the user, including the days and time of the past collaborations, the locations of the past collaborations, the collaboration platforms utilized by the user for each of the past collaborations, and whether a recommendation to switch collaboration platforms was transmitted to the user for any of the past collaborations. In an embodiment, collaboration program 139 retrieves from memory 136 on client device 130 a collaboration history of the user of client device 130. For example, the program on Bob's tablet retrieves a history of Bob's past collaborations from a memory on the tablet.

According to an embodiment, collaboration program 139 identifies a nearest collaboration (step 262). In other words, collaboration program 139 identifies a past collaboration of the user that is nearest (i.e., a closest match) to the first determined (i.e., selected) collaboration of the user. In an embodiment, collaboration program 139 searches the retrieved collaboration history of the user to identify if a past collaboration matches the first determined collaboration. If an exact match is not identified by collaboration program 139, a nearest match is identified (e.g., the same meeting subject but a different location, the same location but a different collaboration platform, etc.). According to an embodiment, collaboration program 139 identifies a nearest past collaboration of the user of client device 130 which is nearest to the selected collaboration. For example, the program on Bob's tablet identifies that Bob attends a weekly meeting which is held at a customer's office building; thus, the program identifies an exact match for Bob's first collaboration of the current day.

In an embodiment, collaboration program 139 recommends a collaboration platform (step 264). In other words, based on the identified nearest collaboration, collaboration program 139 recommends a collaboration platform to be utilized by the user for the determined first collaboration. According to an embodiment, collaboration program 139 recommends to the user the same collaboration platform that was utilized in the identified nearest collaboration. According to another embodiment, based upon the identified nearest collaboration including a past change recommendation, collaboration program 139 recommends the collaboration platform included in said change recommendation to the user so that the user will not need to switch collaboration platforms during the collaboration. In an embodiment, collaboration program 139 recommends a collaboration platform, based on the identified nearest collaboration platform, to the user of client device 130. For example, the program on Bob's tablet recommends that Bob utilize his tablet computer connected to the Internet via a virtual private network (VPN) for the collaboration at the customer's office building; this recommendation is based on Bob's previous use of the tablet & VPN connection for all of the past collaborations at this customer.

According to an embodiment of the present invention, collaboration program 139 determines whether there is another collaboration (decision step 266). In other words, collaboration program 139 determines whether the user has another determined upcoming collaboration within the pre-defined time period. In an embodiment, collaboration program 139 makes the determination by reviewing the previously determined upcoming collaborations of the user (as determined by collaboration program 139). According to an embodiment (decision step 266, YES branch), collaboration program 139 determines that there is another upcoming collaboration for the user in the pre-defined time period; therefore, collaboration program 139 returns to step 258 to determine an associated location of the next upcoming collaboration. According to the embodiment (decision step 266, NO branch), collaboration program 139 determines that there is not another upcoming collaboration for the user in the pre-defined time period; therefore, collaboration program 139 ends.

Figure 3:
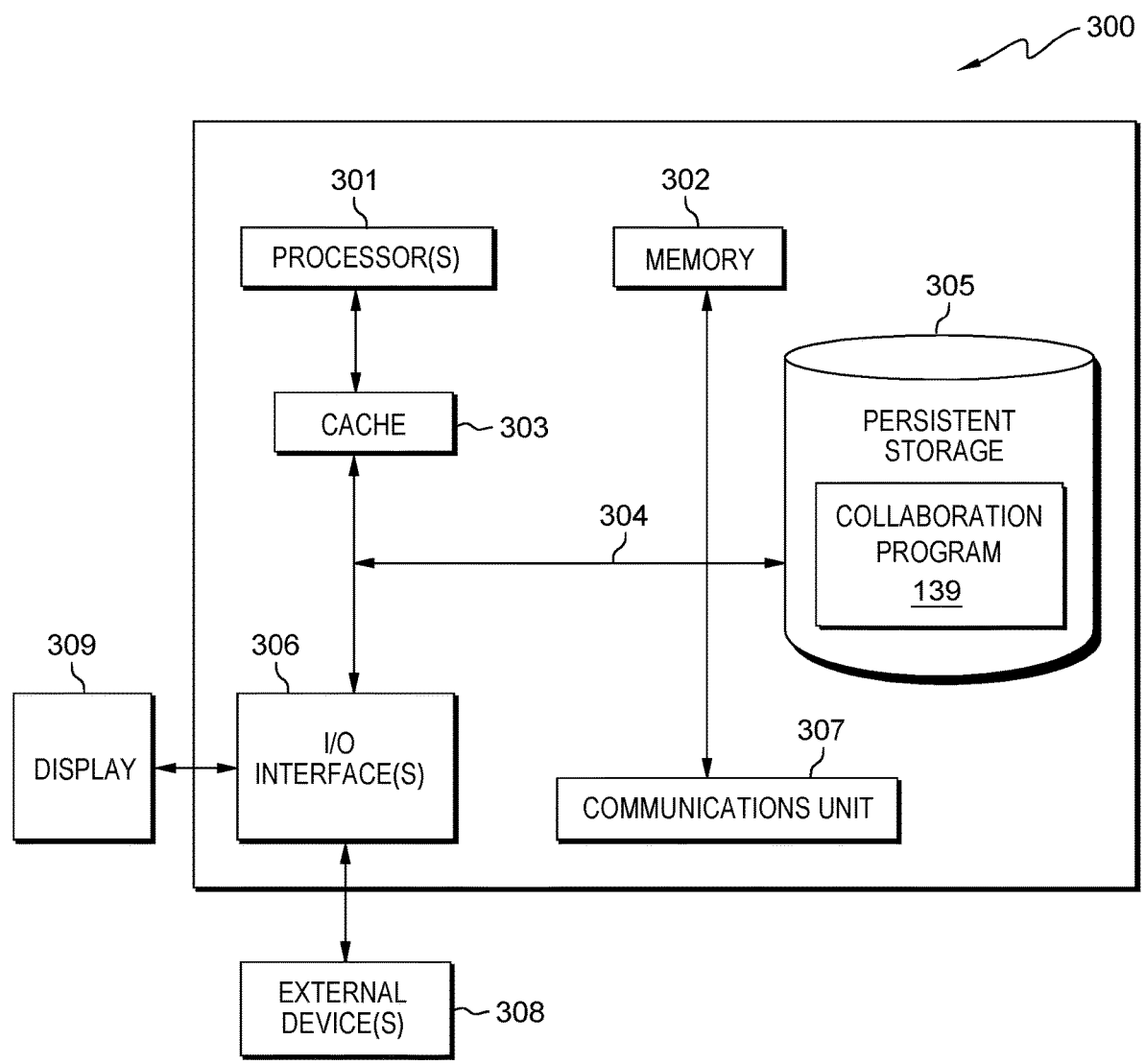
FIG. 3 depicts a block diagram of components of a computing device executing a collaboration program within the computing environment of FIG. 1, in accordance with an embodiment of the present invention.

FIG. 3 depicts computer system 300, which is an example of a system that includes collaboration program 139. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:
   identifying, by one or more computer processors, an optimal collaboration platform of a plurality of collaboration platforms comprising a collaboration program that is a cognitive system which recommends the optimal collaboration platform to a user based on a collaboration platform history of the user;
   monitoring, by one or more computer processors, activity of a user;
   recommending, by one or more computer processors, a change from a current collaboration platform to the identified optimal collaboration platform based on a ranking of the plurality of collaboration platforms and the activity of the user;
   transmitting, by one or more computer processors, the recommendation to the user;
   determining, by one or more computer processors, whether the user accepts the transmitted recommendation; and
   responsive to determining that the user has accepted the transmitted recommendation, initiating, by one or more computer processors, the optimal collaboration platform.

2. The method of claim 1, further comprising:
   responsive to transmitting the recommendation to the user, initiating, by one or more computer processors, the transmitted recommendation for the user by automatically loading and launching the optimal collaboration platform enabling a seamless transition for the user between the current collaboration platform and the optimal collaboration platform.

3. The method of claim 1, further comprising:
   storing, by one or more computer processors, information associated with the transmitted recommendation; and
   receiving, by one or more computer processors, a confirmation from the user of a transition to the optimal platform.

4. The method of claim 1, wherein the step of identifying, by one or more computer processors, an optimal collaboration platform of a plurality of collaboration platforms, comprises:
   receiving, by one or more computer processors, an indication of a user joining a collaboration event;
   confirming, by one or more computer processors, an opt-in of the user to a program;

responsive to confirming the opt-in of the user, determining, by one or more computer processors, event parameters associated with the collaboration event;

identifying, by one or more computer processors, a current location of the user;

determining, by one or more computer processors, a set of available collaboration platforms accessible to the user to utilize for the collaboration event;

determining, by one or more computer processors, a state of a network associated with each collaboration platform included in the set of available collaboration platforms;

ranking, by one or more computer processors, each collaboration platform in the set of available collaboration platforms based on the activity of the user, an ease of availability, the state of the network associated with each collaboration platform, and a cost to utilize; and identifying, by one or more computer processors, the optimal collaboration platform.

5. The method of claim 4, wherein the state of the network associated with each collaboration platform is determined based on at least one of historical network data and real-time diagnostic tests such as a speed test and a signal strength test.

6. The method of claim 1, wherein the step of monitoring, by one or more computer processors, activity of the user, comprises:

accessing, by one or more computer processors, a calendar associated with the user;

determining, by one or more computer processors, one or more upcoming events associated with the user;

monitoring, by one or more computer processors, communications associated with the user, wherein the communications include e-mails, text messages, and phone calls; and monitoring, by one or more computer processors, physical movement of the user to determine if the user changes locations.

7. The method of claim 4, wherein the event parameters include a start time of the collaboration event, an end time of the collaboration event, a subject of the collaboration event, other participants of the collaboration event, and a current collaboration platform being utilized by the user to participate in the collaboration event.

8. The method of claim 6, further comprising:

selecting, by one or more computer processors, a first event of the determined one or more upcoming events;

determining, by one or more computer processors, a current location of the user;

determining, by one or more computer processors, a location associated with the first event;

retrieving, by one or more computer processors, a collaboration history associated with the user, wherein the collaboration history of the user includes a listing of past collaboration of the user including a day and a time associated with each collaboration in the listing, a location associated with each collaboration in the listing of past collaborations, a collaboration platform utilized by the user for each collaboration in the listing of past collaborations, and whether a switch of collaboration platforms was recommended for each collaboration in the listing of past collaborations;

identifying, by one or more computer processors, a nearest collaboration based on the retrieved collaboration history, wherein the nearest collaboration is a closest match from the retrieved collaboration history to the first event; and recommending, by one or more computer processors, a collaboration platform to be utilized by the user for the first event based on the identified nearest collaboration.

9. A computer program product, the computer program product comprising:

one or more computer readable storage media; and program instructions stored on the one or more computer readable storage media, the program instructions comprising:

program instructions to identify an optimal collaboration platform of a plurality of collaboration platforms comprising a collaboration program that is a cognitive system which recommends the optimal collaboration platform to a user based on a collaboration platform history of the user;

program instructions to monitor activity of a user;

program instructions to recommend a change from a current collaboration platform to the identified optimal collaboration platform based on a ranking of the plurality of collaboration platforms and the activity of the user;

program instructions to transmit the recommendation to the user;

program instructions to determine whether the user accepts the transmitted recommendation; and responsive to determining that the user has accepted the transmitted recommendation, program instructions to initiate the optimal collaboration platform.

10. The computer program product of claim 9, further comprising program instructions stored on the one or more computer readable storage media, to:

responsive to transmitting the recommendation to the user, initiate the transmitted recommendation for the user by automatically loading and launching the optimal collaboration platform enabling a seamless transition for the user between the current collaboration platform and the optimal collaboration platform.

11. The computer program product of claim 9, further comprising program instructions stored on the one or more computer readable storage media, to:

store information associated with the transmitted recommendation; and receive a confirmation from the user of a transition to the optimal platform.

12. The computer program product of claim 9, wherein the program instructions to identify an optimal collaboration platform of a plurality of collaboration platforms, comprise:

program instructions to receive an indication of a user joining a collaboration event;

program instructions to confirming, by one or more computer processors, an opt-in of the user to a program;

responsive to confirming the opt-in of the user, program instructions to determine event parameters associated with the collaboration event;

program instructions to identify a current location of the user;

program instructions to determine a set of available collaboration platforms accessible to the user to utilize for the collaboration event;

program instructions to determine a state of a network associated with each collaboration platform included in the set of available collaboration platforms;

program instructions to rank each collaboration platform in the set of available collaboration platforms based on the activity of the user, an ease of availability, the state of the network associated with each collaboration platform, and a cost to utilize; and program instructions to identify the optimal collaboration platform.

13. The computer program product of claim 12, wherein the state of the network associated with each collaboration platform is determined based on at least one of historical network data and real-time diagnostic tests such as a speed test and a signal strength test.

14. The computer program product of claim 9, wherein the program instructions to monitor activity of the user, comprises:
   program instructions to access a calendar associated with the user;
   program instructions to determine one or more upcoming events associated with the user;
   program instructions to monitor communications associated with the user, wherein the communications include e-mails, text messages, and phone calls; and
   program instructions to monitor physical movement of the user to determine if the user changes locations.

15. The computer program product of claim 12, wherein the event parameters include a start time of the collaboration event, an end time of the collaboration event, a subject of the collaboration event, other participants of the collaboration event, and a current collaboration platform being utilized by the user to participate in the collaboration event.

16. The computer program product of claim 14, further comprising program instructions stored on the one or more computer readable storage media, to:
   select a first event of the determined one or more upcoming events;
   determine a current location of the user;
   determine a location associated with the first event;
   retrieve a collaboration history associated with the user, wherein the collaboration history of the user includes a listing of past collaboration of the user including a day and a time associated with each collaboration in the listing, a location associated with each collaboration in the listing of past collaborations, a collaboration platform utilized by the user for each collaboration in the listing of past collaborations, and whether a switch of collaboration platforms was recommended for each collaboration in the listing of past collaborations;
   identify a nearest collaboration based on the retrieved collaboration history, wherein the nearest collaboration is a closest match from the retrieved collaboration history to the first event; and
   recommend a collaboration platform to be utilized by the user for the first event based on the identified nearest collaboration.

17. A computer system, the computer system comprising:
   one or more computer processors;
   one or more computer readable storage media; and
   program instructions stored on the one or more computer readable storage media for execution by at least one of the one or more computer processors, the program instructions comprising:
      program instructions to identify an optimal collaboration platform of a plurality of collaboration platforms comprising a collaboration program that is a cognitive system which recommends the optimal collaboration platform to a user based on a collaboration platform history of the user;
      program instructions to monitor activity of a user;
      program instructions to recommend a change from a current collaboration platform to the identified optimal collaboration platform based on a ranking of the plurality of collaboration platforms and the activity of the user;
      program instructions to transmit the recommendation to the user;
      program instructions to determine whether the user accepts the transmitted recommendation; and
      responsive to determining that the user has accepted the transmitted recommendation, program instructions to initiate the optimal platform.

18. The computer system of claim 17, further comprising program instructions stored on the one or more computer readable storage media for execution by at least one of the one or more computer processors, to:
   responsive to transmitting the recommendation to the user, initiate the transmitted recommendation for the user by automatically loading and launching the optimal collaboration platform enabling a seamless transition for the user between the current collaboration platform and the optimal collaboration platform.

19. The computer system of claim 17, further comprising program instructions stored on the one or more computer readable storage media for execution by at least one of the one or more computer processors, to:
   store information associated with the transmitted recommendation; and
   receive a confirmation from the user of a transition to the optimal platform.

20. The computer system of claim 17, wherein the program instructions to identify an optimal collaboration platform of a plurality of collaboration platforms, comprise:
   program instructions to receive an indication of a user joining a collaboration event;
   program instructions to confirming, by one or more computer processors, an opt-in of the user to a program;
   responsive to confirming the opt-in of the user, program instructions to determine event parameters associated with the collaboration event;
   program instructions to identify a current location of the user;
   program instructions to determine a set of available collaboration platforms accessible to the user to utilize for the collaboration event;
   program instructions to determine a state of a network associated with each collaboration platform included in the set of available collaboration platforms;
   program instructions to rank each collaboration platform in the set of available collaboration platforms based on the activity of the user, an ease of availability, the state of the network associated with each collaboration platform, and a cost to utilize; and
   program instructions to identify the optimal collaboration platform.

* * * * *